Patented Nov. 5, 1940

2,220,843

UNITED STATES PATENT OFFICE 2,220,843

LUBRICANT

James W. Johnson, Philadelphia, Pa., assignor to The Atlantic Refining Company, Philadelphia, Pa., a corporation of Pennsylvania No Drawing. Application October 19, 1937, Serial No. 169,800

2 Claims. (Cl. 252—37)

The present invention relates to the art of lubrication, and more particularly to the lubrication of surfaces engaging under extreme pressure, as for example, the rubbing surfaces of hypoid gears, free wheeling transmissions, speed reducers and the like.

The general tendency in the design of modern machinery has been toward a higher ratio between power and "dead weight". This is especially true in the automotive industry, and in recent years certain types of gears and other mechanisms have been developed with the operating pressures on the working surfaces so high that ordinary mineral oil lubricants will not provide sufficient lubrication for satisfactory operation.

Heretofore it has been thought that lubrication consists in maintaining a film of oil between the rubbing surfaces, thereby preventing them from coming into contact with one another and thus preventing wear. That this condition exists in well lubricated bearings is well known, but this conception of lubrication does not apply to highly loaded gears. In well lubricated bearings the loads rarely exceed 2000 lbs. per sq. in. projected area and the rubbing speeds are generally high enough to maintain a film of oil which separates the rubbing surfaces. In automobile gears, the pressures between gear teeth reach very high values and even the most viscous oils or greases cannot be retained between the surfaces of the teeth in a sufficiently thick film to prevent metal to metal contact, particularly when operating temperatures of 210° F. or higher are commonly encountered.

It has been known that compounded lubricants such as, for example, mineral oils containing fatty oils, fatty acids, metallic soaps, sulfur or combined chlorine, possess lubricating qualities which render them suitable for use under high operating pressures. These compounded oils function satisfactorily under conditions which would cause failure of an unblended mineral oil, if used alone. It is believed that the successful use of such compounded oils depends upon the adsorption and reaction or union of certain components of these oils with the metal surfaces whereby a film of metallic compound, such as, for example, iron sulfide or chloride is formed. It appears that such a film or plating has a low coefficient of friction and that satisfactory operation of heavily loaded bearings or gears depends upon the formation and maintenance of such a film, and not upon the retaining of a film of oil between the bearing surfaces. The hydrocarbon oil constituent of an extreme pressure lubricant serves primarily to remove frictional heat, to wash away any solid particles which may result from wear, and to prevent oxidation of the engaging surfaces.

In the lubrication of automotive power transmission mechanisms, and particularly hypoid gears, it has been common practice to employ a lubricant consisting essentially of a non-refined petroleum residual or "black" oil containing a lead soap and free or corrosive sulfur. Such compounded lubricants are not entirely satisfactory since sulfur is not very soluble in mineral oil and quantities in excess of 1% or 1.25% tend to precipitate from solution in the oil when cooled to temperatures of the order of 0° F. On the other hand, sulfur which is chemically combined with fatty oil, or mineral oil, or a mixture of such oils, is not subject to precipitation upon cooling, but has lost considerable of its activity by virtue of its being chemically united with the oil molecules and thus rendered stable and non-corrosive. Furthermore, at higher temperatures, the lead soap tends to react with the free sulfur to form lead sulfide which precipitates in the lubricant, to the detriment of the lubricating value thereof.

I have found that the mentioned difficulties may be minimized or overcome by employing a lubricating composition containing sulfur which is neither entirely in the free state nor so tightly bound chemically that it fails to function in the lubricant in the desired manner. In order to render the sulfur in the lubricant substantially non-corrosive and yet capable of functioning as an agent for increasing the load-bearing ability of the lubricant under the conditions encountered in practice, for example, in the lubrication of hypoid gears, I may employ, in conjunction with a mineral oil or other lubricating vehicle, an agent for loosely binding a major portion of the sulfur in chemical combination, while at the same time increasing the solubility of the loosely bound sulfur, as well as any free sulfur, in the lubricating oil.

Among the agents which I have found suitable for this purpose are the synthetic esters of unsaturated organic acids, and particularly the esters of abietic acid such as methyl abietate, ethyl abietate, propyl abietate and the abietic esters of the higher aliphatic alcohols. Unsaturated alcohols such as abietyl alcohol, furfuryl alcohol, allyl alcohol, crotonyl alcohol and oleyl alcohol may be utilized in preparing the esters. The aromatic esters may also be employed and include phenyl abietate, cresyl abietate, xylyl abietate and naphthyl abietate. Esters of unsaturated acids other than abietic acid which may suitably be employed are the aliphatic and aromatic esters of pimaric acid, retene carboxylic acids, phenanthrene carboxylic acids, crude or refined rosin acids, rosin oil acids, acrylic acid, crotonic acid, fumaric acid, maleic acid and oleic acid.

In accordance with my invention, I may admix elemental sulfur, in quantities up to about 20% or more, with a synthetic ester of an unsaturated acid and heat the mixture to a temperature sufficient to effect a loose chemical combination of at least a portion of the sulfur with the ester. In general, it has been found that temperatures of the order of from about 250° F. to about 400° F. are sufficient to effect the desired combination. Such heating step may be carried on at atmospheric pressure, provision being made that neither the ester nor the sulfur is lost by volatilization. If desired, the heating step may be effected under superatmospheric pressure which may be simply the vapor pressure of the combining materials, or pressure supplied by means of a gaseous medium, preferably an inert gas such as carbon dioxide, nitrogen or the like. In forming the loose chemical combination of sulfur with the ester by heating, little or no hydrogen sulfide is evolved.

It has been known heretofore that lubricants may be prepared by sulfurizing mineral oils or fatty oils such as lard oil, corn oil, fish oils and other natural glycerides. My invention is to be distinguished over the prior art practice in that the ester-sulfur compounds produced in accordance with my process are noncorrosive and stable, and lubricating oils containing same do not thicken or tend to become gummy and deposit sludge during use, in contrast to the sulfur base lubricants containing sulfurized fatty and/or mineral oils. The synthetic esters which I employ in preparing my ester-sulfur compounds are stable, individual chemical compounds and are not to be confused with the natural fats, fatty oils and glycerides employed heretofore.

The ester-sulfur compound produced in accordance with my invention may be added to hydrocarbon or other lubricating oil in any desired quantity, for example, 1%, 2%, 5%, 10% or 20% or more. In preparing my lubricant, I may obtain a homogeneous solution or suspension of the ester-sulfur compound in oil by agitating the mixture at normal or elevated temperatures, or I may dissolve the compound in a suitable solvent and add the resulting solution to oil, thereafter removing the solvent, if desired, by vaporization. As an alternative method of procedure, I may effect a loose chemical combination of sulfur with an ester of an unsaturated organic acid in the presence of lubricating oil by heating a mixture of sulfur, ester and oil to a temperature sufficient to effect combination and then cooling the mixture. The compounded oil so prepared may be used as a lubricant, per se, or may be further diluted with oil or other agent.

In the lubrication of mechanisms operating under heavy loads, for example, hypoid gears, it appears that the ester-sulfur compound in my lubricant functions to increase the film strength or load-carrying ability of the oil, whereby scoring or seizing of the gear teeth is prevented. In order to further improve my lubricating composition, particularly with respect to decreasing the friction between the parts lubricated therewith, I have found it desirable, in some cases, to add to the ester-sulfur-oil mixture one or more compounds which are capable of reducing friction or of increasing the "oiliness" of the lubricant. Among the friction reducing agents which may be suitably employed may be mentioned the oil-soluble salts or soaps of the metals such as lead naphthenate, bismuth naphthenate, copper naphthenate, zinc naphthenate and molybdenum naphthenate; stearic acid; glycol distearate; methyl stearate; and aromatic nitro compounds such as dinitrobenzene.

My invention may be further illustrated by the following examples, in which the lubricants prepared were tested in an S. A. E. extreme pressure lubricants testing machine, operating at 1000 R. P. M., with a rubbing speed ratio of 14.6 to 1 and a loading rate of 83.5 lbs. per second. The maximum load capacity of the testing machine was 580 lbs., and lubricants capable of withstanding this load were considered to be satisfactory extreme pressure lubricants.

*Example 1*

4.5 parts by weight of methyl abietate was admixed and heated with 1.9 parts by weight of elementary sulfur at a temperature of about 300° F. for a period of about 20 minutes, no hydrogen sulfide being evolved. To the ester-sulfur compound so formed there was then added 93.6 parts by weight of lubricating oil having a Saybolt Universal viscosity of 93 seconds at 210° F., an A. P. I. gravity of 24.8°, a pour test of 0.° F., and an N. P. A. color of 6. The ester-sulfur-oil mixture was warmed and agitated until a stable, homogeneous lubricant was obtained. Such lubricant had substantially the same color as the initial lubricating oil, did not deposit sulfur upon cooling to about 0° F., and was not corrosive to copper immersed therein at room temperature for a period of two minutes. Upon testing this compounded lubricant in the S. A. E. testing machine under the conditions above described, such lubricant withstood the full load, i. e., 580 lbs.

By way of comparison, it was found that the initial lubricating oil, under a similar test, completely failed to withstand any load. Furthermore, when about 1.5 parts by weight of elementary sulfur was dissolved in the initial lubricating oil, such lubricant withstood a load of only 225 lbs., and in addition, was corrosive to copper and deposited sulfur upon cooling.

*Example 2*

To the methyl abietate-sulfur-oil lubricant of Example 1 there was added about 5 parts by weight of lead naphthenate and the mixture was warmed and agitated until a stable homogeneous solution was obtained. This compounded lubricant, when tested in the S. A. E. testing machine, withstood the full load of 580 lbs. and appeared to reduce friction between the test bearings, since the bearing temperatures were somewhat lower than when operating with the compounded lubricant of Example 1.

*Example 3*

7.2 parts by weight of methyl oleate was admixed and heated with 2 parts by weight of elementary sulfur at a temperature of about 340° F. for a period of about 20 minutes, no hydrogen sulfide being evolved. To the ester-sulfur compound so formed there was added 90.8 parts by weight of lubricating oil having the same properties as that employed in Example 1. The estersulfur-oil mixture was warmed and agitated until a homogeneous lubricant was obtained. This lubricant, similar to that of Example 1, was of substantially the same color as the initial lubricating oil, was non-corrosive to copper and did not deposit sulfur upon cooling. When tested in the S. A. E. testing machine, under the conditions hereinbefore described, such compounded lubricant likewise withstood the full load of the machine, i. e., 580 lbs.

*Example 4*

5 parts by weight of methyl abietate was admixed and heated with 2 parts by weight of elementary sulfur at a temperature of about 340° F. for about 20 minutes, substantially no hydrogen sulfide being evolved. To the ester-sulfur compound so formed there was then added 93 parts by weight of a lubricating oil having a Saybolt Universal viscosity of 80 seconds at 219° F., and about 12.5 parts by weight of zinc naphthenate. This mixture was agitated at about 300° F. until a homogeneous solution was obtained which did not deposit sulfur upon cooling to about 0° F., and was not corrosive to a copper strip immersed therein at room temperature for a period of two minutes. Upon testing this compounded lubricant in the S. A. E. testing machine under the conditions described hereinbefore, such lubricant withstood the full load, i. e., 580 lbs.

*Example 5*

5 parts by weight of methyl abietate was admixed and heated with 2 parts by weight of elementary sulfur at a temperature of about 340° F. for about 20 minutes, substantially no hydrogen sulfide being evolved. To the ester-sulfur compound so formed there was added about 92 parts by weight of a black oil having a Saybolt Universal viscosity of 80 seconds at 210° F. This ester-sulfur-black oil mixture was warmed and agitated until a homogeneous solution was obtained. When such compounded lubricant was tested in the S. A. E. testing machine, it likewise withstood the full load of 580 lbs.

*Example 6*

To the methyl abietate-sulfur-black oil lubricant of Example 5 there was added 5 parts by weight of lead naphthenate, and the mixture was warmed and agitated until a homogeneous solution was obtained. This compounded lubricant also withstood the full load of 580 lbs. applied on the S. A. E. testing machine.

It will be seen from the above examples, that the addition of my ester-sulfur compounds to a hydrocarbon oil improves the lubricating value of such an oil to a marked degree, and imparts to the oil certain properties which render it suitable for use in the lubrication of surfaces engaging under extreme pressure. In Examples 1 to 4 the initial lubricating oil used was a refined oil or bright stock having a relatively light color. Since the addition of the ester-sulfur compounds does not effect substantial darkening of the color of the oil, it is possible to produce finished lubricants of relatively light color, a factor which is of considerable importance in the marketing of the lubricant. However, it is to be understood that my ester-sulfur compounds may be employed in conjunction with any lubricating stock, including the non-refined residual or black oils now in common use, as exemplified in Examples 5 and 6.

In order to illustrate the marked improvement in stability with respect to both viscosity and load-bearing ability of my lubricant as compared with extreme pressure lubricants employed heretofore, samples of the various lubricants were subjected to heating at 275° F. (in contact with air), and were periodically tested for change in viscosity and load-bearing ability. The results of such tests are shown in the following table:

| Lubricant composition | Weight per cent | Hours heating at 275° F. | | | | | | | | | |
|---|---|---|---|---|---|---|---|---|---|---|---|
| | | 0 | | 16 | | 40 | | 64 | | 88 | |
| | | S. U. vis. 210° F. | S. A. E. load | S. U. vis. 210° F. | S. A. E. load | S. U. vis. 210° F. | S. A. E. load | S. U. vis. 210° F. | S. A. E. load | S. U. vis. 210° F. | S. A. E. load |
| (A) 80 vis. @ 210° F., bright stock | 93 | Seconds 79.3 | 580+ | Seconds 79.7 | 580+ | Seconds 82.7 | 570 | Seconds 80.5 | 570 | Seconds 82.7 | 560 |
| Methyl abietate | 5 | | | | | | | | | | |
| Sulfur | 2 | | | | | | | | | | |
| (B) 80 vis. @ 210° F., bright stock | 88 | 82.2 | 580+ | 79.3 | 580+ | 80.0 | 580+ | 86.0 | 580+ | 83.0 | 570 |
| Methyl abietate | 5 | | | | | | | | | | |
| Sulfur | 2 | | | | | | | | | | |
| Lead naphthenate | 5 | | | | | | | | | | |
| (C) 77 vis. @ 210° F., bright stock | 93.5 | 79.0 | 580+ | 77.5 | 580+ | 80.7 | 580+ | 85.3 | 205 | 89.0 | Failed |
| Sulfur | 1.5 | | | | | | | | | | |
| Lead naphthenate | 5.0 | | | | | | | | | | |
| (D) 80 vis. @ 210° F., black oil | 93.5 | 85.0 | 580+ | 86.3 | 580+ | 90.7 | 100 | 101.7 | 90 | 101.2 | 60 |
| Sulfur | 1.5 | | | | | | | | | | |
| Lead naphthenate | 5.0 | | | | | | | | | | |
| (E) 80 vis. @ 210° F., black oil | 98.5 | 85.3 | 580+ | 88.7 | 580+ | 90.5 | 580+ | 13.0 | 570 | 120.2 | 560 |
| Sulfur | 1.5 | | | | | | | | | | |

The lubricant composition of Example A, above, which comprises a bright stock having a Saybolt Universal viscosity of 80″ at 210° F., and a methyl abietate-sulfur compound, and of Example B containing lead naphthenate, when subjected to heating at 275° F. for varying periods, exhibits a very small change either in viscosity or load-bearing ability, whereas the compositions of Examples C and D both exhibit a gradual increase in viscosity and a marked decrease in load-bearing ability. In Example E, the black oil-sulfur mixture, while retaining load-bearing ability, showed an undesirably great increase in viscosity. It will be seen, from the above examples, that the lubricating compositions of my invention (Examples A and B) are considerably more stable and satisfactory than the lubricants conventionally employed heretofore (Examples C, D and E).

The mechanism by which the ester-sulfur compound in lubricating oils functions to improve the load-bearing ability and other properties thereof is not entirely understood. It appears, however, that the functioning is dependent upon the adsorption of the compound upon the metal surfaces of the gears or bearings, or other lubricated parts, and the reaction or chemical combination of such compound with the metal under the influence of localized high temperature and pressure to form a coating or plating having a low coefficient of friction which is resistant to seizure under high operating pressures.

While I have described my invention with reference to the lubrication of gears and bearings operating under heavy loads, I do not intend to limit myself thereto, but contemplate the use of my lubricant in operations such as the cutting, boring, and shaping of metals, in which conditions of extreme pressure and temperature are normally encountered, and also in the lubrication of mechanisms operating under moderate pressures, as for example, the crankcase bearings and cylinder walls of internal combustion engines. Furthermore, my compounded lubricant may be utilized as a base in the preparation of thickened oils, i. e., greases, by the addition thereto of soaps or other conventional thickening agents, in order to obtain lubricants of desired viscosity. My compounded lubricant may also be blended with fatty oils, fatty acids, synthetic esters and the like, or the ester-sulfur compounds per se, may be admixed with fatty oils, for the lubrication of mechanisms in which the presence of a fatty oil is desirable. In some cases I may employ my ester-sulfur compound, per se, as a lubricant, no mineral or other oil being added thereto.

Herein and in the appended claims, the term "refined oil" is to be understood to comprehend hydrocarbon lubricating oils which have been subjected to a refining treatment for the removal of color-bodies, asphaltic materials and the like.

What I claim is:

1. An extreme pressure lubricating composition comprising 88 to 94 parts by weight of refined lubricating oil, 5 to 12 parts by weight of an oil-soluble heavy metal naphthenate and 6 to 7 parts by weight of a sulfurized aliphatic ester of abietic acid, the amounts of said latter two constituents being sufficient to increase substantially the load bearing ability and decrease the wear between relatively moving metallic surfaces, when said composition is used for the lubrication thereof.

2. An extreme pressure lubricating composition comprising about 93 to 94 parts by weight of refined lubricating oil, about 5 parts by weight of lead naphthenate, and about 6 to 7 parts by weight of sulfurized methyl abietate, the amounts of said latter two constituents being sufficient to increase substantially the load bearing ability and decrease the wear between relatively moving metallic surfaces, when said composition is used for the lubrication thereof.

JAMES W. JOHNSON.

CERTIFICATE OF CORRECTION.

Patent No. 2,220,843.                                                November 5, 1940.

JAMES W. JOHNSON.

It is hereby certified that error appears in the printed specification of the above numbered patent requiring correction as follows: Page 3, first column, line 20-21, for "219° F." read --210° F.--; and that the said Letters Patent should be read with this correction therein that the same may conform to the record of the case in the Patent Office.

Signed and sealed this 10th day of December, A. D. 1940.

(Seal)

Henry Van Arsdale,
Acting Commissioner of Patents.